(12) United States Patent
Kozlovski

(10) Patent No.: US 9,817,014 B2
(45) Date of Patent: Nov. 14, 2017

(54) SAW-BASED TACHOMETER OR RPM DETECTOR

(71) Applicant: Mnemonics, Inc., Melbourne, FL (US)

(72) Inventor: Nikolai Kozlovski, Orlando, FL (US)

(73) Assignee: Mnemonics, Inc., Melbourne, FL (US)

(*) Notice: Subject to any disclaimer, the term of this patent is extended or adjusted under 35 U.S.C. 154(b) by 0 days.

(21) Appl. No.: 14/294,352

(22) Filed: Jun. 3, 2014

(65) Prior Publication Data

US 2015/0068305 A1    Mar. 12, 2015

Related U.S. Application Data

(60) Provisional application No. 61/830,247, filed on Jun. 3, 2013.

(51) Int. Cl.
| | | |
|---|---|---|
| *G01C 22/00* | (2006.01) | |
| *G01C 19/5698* | (2012.01) | |
| *G01P 3/481* | (2006.01) | |

(52) U.S. Cl.
CPC .................................. *G01P 3/481* (2013.01)

(58) Field of Classification Search
CPC ...... G01C 22/00; G01C 19/5698; G01C 23/00
USPC ....................................................... 73/504.01
See application file for complete search history.

(56) References Cited

U.S. PATENT DOCUMENTS

| | | | |
|---|---|---|---|
| 6,060,815 A | 5/2000 | Nysen | |
| 5,627,444 A1 | 1/2005 | Arms et al. | |
| 6,992,547 B2 | 1/2006 | Bergmann | |
| 7,023,200 B2 | 4/2006 | Spellman | |
| 7,642,898 B1* | 1/2010 | Malocha | ............. H03H 9/6406 |
| | | | 340/10.41 |
| 8,639,934 B2 | 1/2014 | Kruglick | |
| 2005/0017602 A1* | 1/2005 | Arms | .................. B60C 23/0411 |
| | | | 310/339 |
| 2012/0089299 A1* | 4/2012 | Breed | ..................... B60C 11/24 |
| | | | 701/36 |
| 2013/0228616 A1 | 9/2013 | Bhosle | |

* cited by examiner

*Primary Examiner* — Max Noori
*Assistant Examiner* — Jamel Williams
(74) *Attorney, Agent, or Firm* — John L. DeAngelis; Beusse Wolter Sanks & Maire, PLLC.

(57) ABSTRACT

A method is provided for determining a number of revolutions per minute (RPM) of a rotating object. The method includes transmitting interrogation signals at a regular period from a fixed antenna positioned adjacent to the rotating object. The method also includes transmitting echo signals from a sensor antenna positioned on the rotating object, in response to the interrogation signals. The method also includes counting a number of echo signals detected by the fixed antenna, during one revolution of the object. The method also includes determining the RPM of the rotating object based on the number of response signals and the regular period of the signals. A system is also provided for determining the number of revolutions per minute (RPM) of the rotating object.

17 Claims, 6 Drawing Sheets

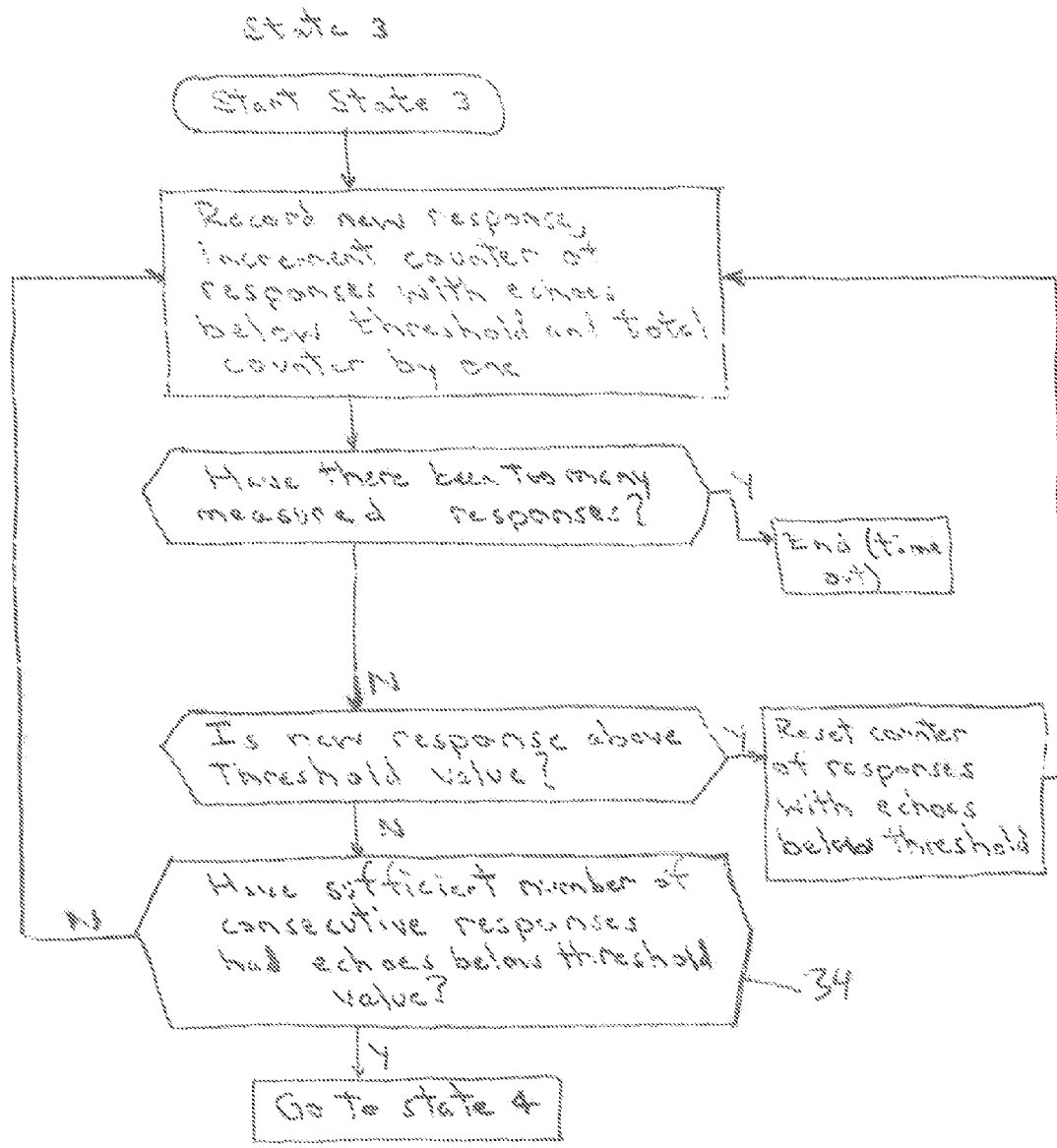

SAW-BASED TACHOMETER OR RPM DETECTOR

CROSS REFERENCE TO RELATED APPLICATIONS

The present invention claims priority under 35 U.S.C. 119(e) to the provisional patent application filed on Jun. 3, 2014 and assigned application Ser. No. 61/830,247. This provisional patent application is incorporated in its entirety herein.

FIELD OF THE INVENTION

The present invention applies to passive wireless Surface Acoustic Wave (SAW) devices for use in determining rotational or RPMs.

BACKGROUND OF THE INVENTION

A SAW device produces a delayed echo when interrogated by an RF pulse (i.e., an interrogating signal or incident signal) from a radio frequency (RF) transmitter. The echo response or echo signal is produced passively, that is, similar to a light-reflecting mirror. However, like a distorting carnival mirror, the echo signal carries a signature of the reflecting device as well as a signature of the incident signal. The echo signal is re-transmitted from the SAW device to an RF receiver where it is analyzed to determine characteristics of the echo response and the material on which the SAW device mounted.

FIG. 1 depicts a prior art SAW device 410. An interrogating or illuminating wave comprises a radio frequency (RF) signal pulse 412 transmitted by an RF transceiver or interrogator 414. The transmitted signal travels through space to each SAW device within the field of view of the SAW interrogator 414. Only one SAW device 410 is illustrated in FIG. 1. The interrogating signal is received by an antenna 418 connected to an interdigital transducer (IDT) 420 disposed on a piezoelectric substrate 424. The IDT 420 launches an incident surface acoustic wave (SAW) 428 onto the piezoelectric substrate 424 in response to the received interrogation signal.

The SAW 428 propagates along the substrate 424 and is received at a reflector array 430 also disposed on the piezoelectric substrate 424. In applications where several SAW devices are within range of the RF transceiver each provides a reflected signal back to the RF transceiver. The reflector array 430 of each SAW device in a system of SAW devices (where the SAW device 410 is one SAW device within that system) comprises a unique pattern of metal electrodes 434 that impart a unique impulse response to the incident SAW 428. The impulse response of the reflector array 30 is imparted to the incident SAW 28 as it launches a reflected SAW 34 back to the IDT 420. The impulse response may include information about the spacing of the elements comprising the array 430, where a change in that spacing is caused, for example, by expansion or contraction of the substrate 424. The IDT 420 then converts the acoustic wave to an electrical signal that is radiated from the antenna 418 back to the RF transceiver 414 for extraction of the desired information in the reflected signal.

Surface acoustic wave (SAW) devices have been successfully used as temperature, mechanical, and rotational sensors, for example.

BRIEF DESCRIPTION OF THE FIGURES

The foregoing and other features of this invention will be apparent from the following more particular description of the invention, as illustrated in the accompanying drawings, in which like reference characters refer to the same parts throughout the different figures.

FIG. 4C is a flowchart depicting a process to interrogate a sensor antenna of the tachometer of FIG. 2 while in the interrogatable range.

DETAILED DESCRIPTION OF THE INVENTION

Figure 1:
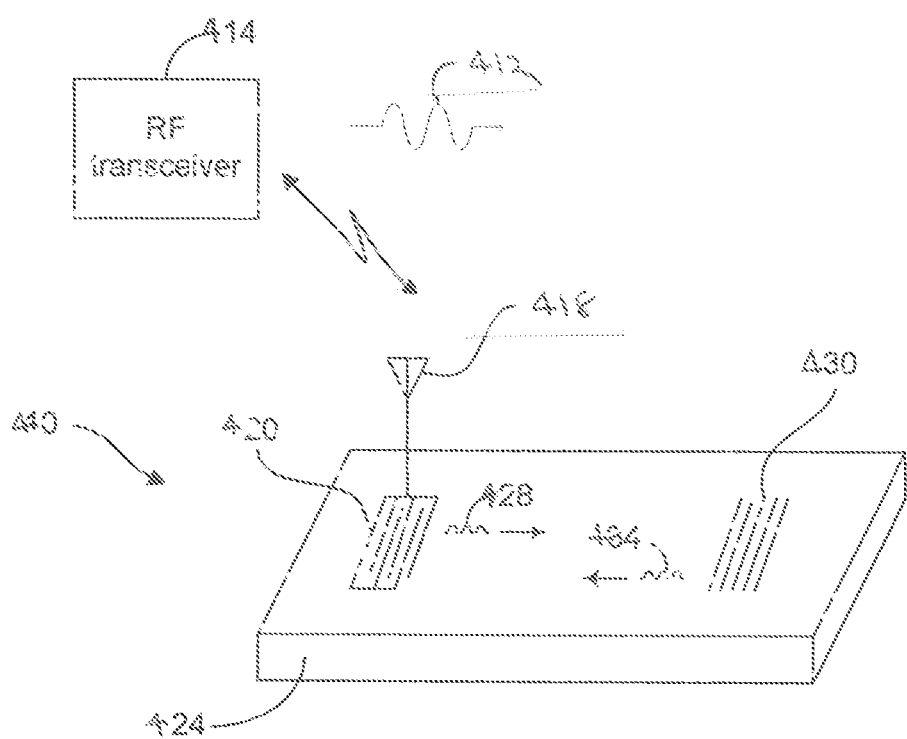
FIG. 1 illustrates a prior art SAW device.
Figure 2:
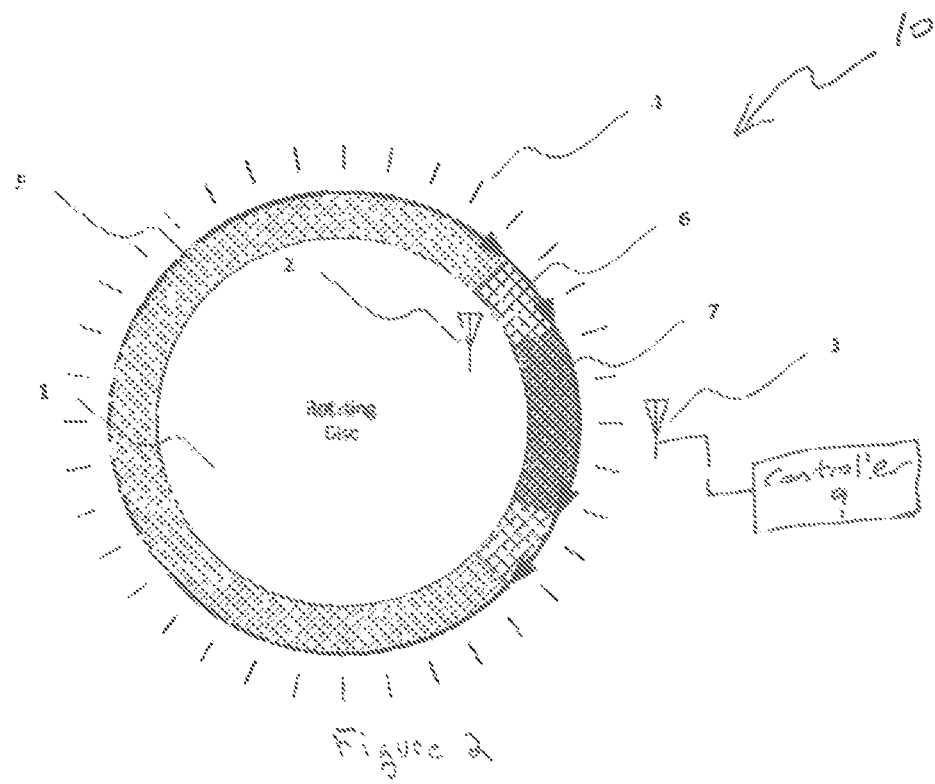
FIG. 2 is a top view of an embodiment of a saw-based tachometer in accordance with the present invention.

FIG. 2 illustrates elements of a SAW-based (Surface Acoustic Wave) tachometer 10, with an interrogating SAW sensor including a sensor antenna 2 placed on a rotating object, such as a rotating disc 1. It is desired to determine a rotational speed of the disc 1, such as the revolutions per minute (RPM) of the disc 1, for example. An interrogating signal, such as an RF (Radio Frequency) burst is emitted from a fixed interrogator antenna 3 positioned adjacent to the rotating disc 1. The RF burst is received by the sensor antenna 2 and an echo signal is retransmitted back to the interrogator antenna 3. Tick marks 4 indicate the position of the sensor antenna 2 during each interrogation instance.

A controller 9 is coupled to the fixed antenna 3, to count the number of transmitted interrogation signals or detected echo signals during one revolution of the disc 1, as discussed below. However, the controller 9 need not be an individual component of the tachometer 10 and may be an internal controller of the interrogator antenna 3 or a controller positioned remotely from the tachometer 10, for example.

In one embodiment the fixed interrogator antenna 3 transmits the interrogation signals at a regular period. For example, the sensor antenna 2 may be interrogated every 12 microseconds, and for practical applications (even for high rpm values such as in the 9000 RPM range) during each interrogation, the sensor antenna 2 can be assumed stationary. In an example, at 9000 rpm the interrogator antenna 3 acquires a sensor echo 555 times during each revolution, which means from one tick (one interrogation) to the next tick (the next interrogation) the sensor antenna 2 has moved less than one degree. However, the embodiments of the present invention are not limited to any specific period of the interrogation signals or RPM range of the disc 1.

As the sensor antenna 2 approaches or recedes from the interrogator antenna 3, the amplitude of the echo signal increases or decreases respectively. The controller 9 counts the number of interrogations or echo signals between the time when the echo signal amplitude crossed a predetermined threshold value to the time when it next re-crosses that threshold value amplitude. During this interval the rotating disc 1 has completed one complete revolution and the RPM value is calculated from the number of interrogations or echo signals during one revolution and the regular period of each interrogation.

The RPM value is calculated from

RPM=60/(number of interrogations per revolution*regular period of each interrogation) where the period of each interrogation is equivalent to the time between interrogations (seconds/interrogation) or the inverse of the interrogation frequency (inverse of the number of interrogations/time interval).

A cycle or single revolution can be separated into three regions as shown in FIG. 2: the sensor antenna 2 is completely out of range in a region 5, the sensor antenna 2 may be detectible but the echo signal is below a predetermined threshold value in a region 6, and finally the sensor antenna 2 is detectible and the echo signal amplitude is above the predetermined threshold value in a region 7. As illustrated in FIG. 2, the region 7 is more proximate to the fixed antenna 3 than regions 5, 6.

One technique for detecting the RPM value is to find two points, one when the echo signal goes just below a threshold value to a point where the echo signal goes just above it. One embodiment uses the point where the sensor antenna 2 crosses from region 6 into region 7 and the other as the point where the sensor antenna 2 crosses from region 7 into region 6.

Figure 3:
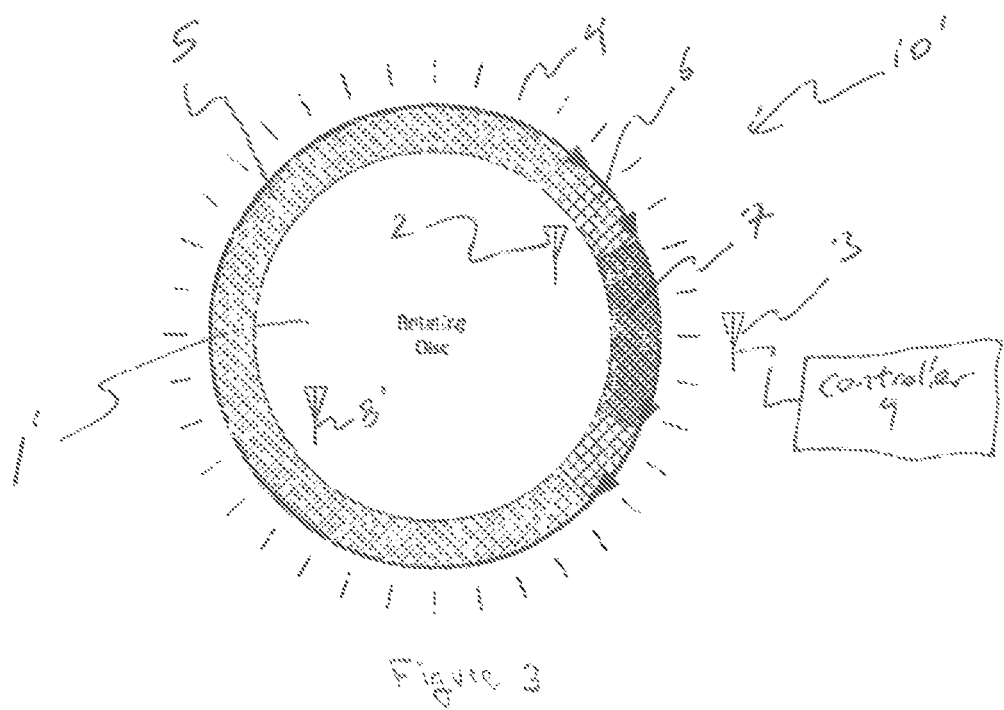
FIG. 3 is a top view of an alternate embodiment of a saw-based tachometer in accordance with the present invention.
Figure 4A:
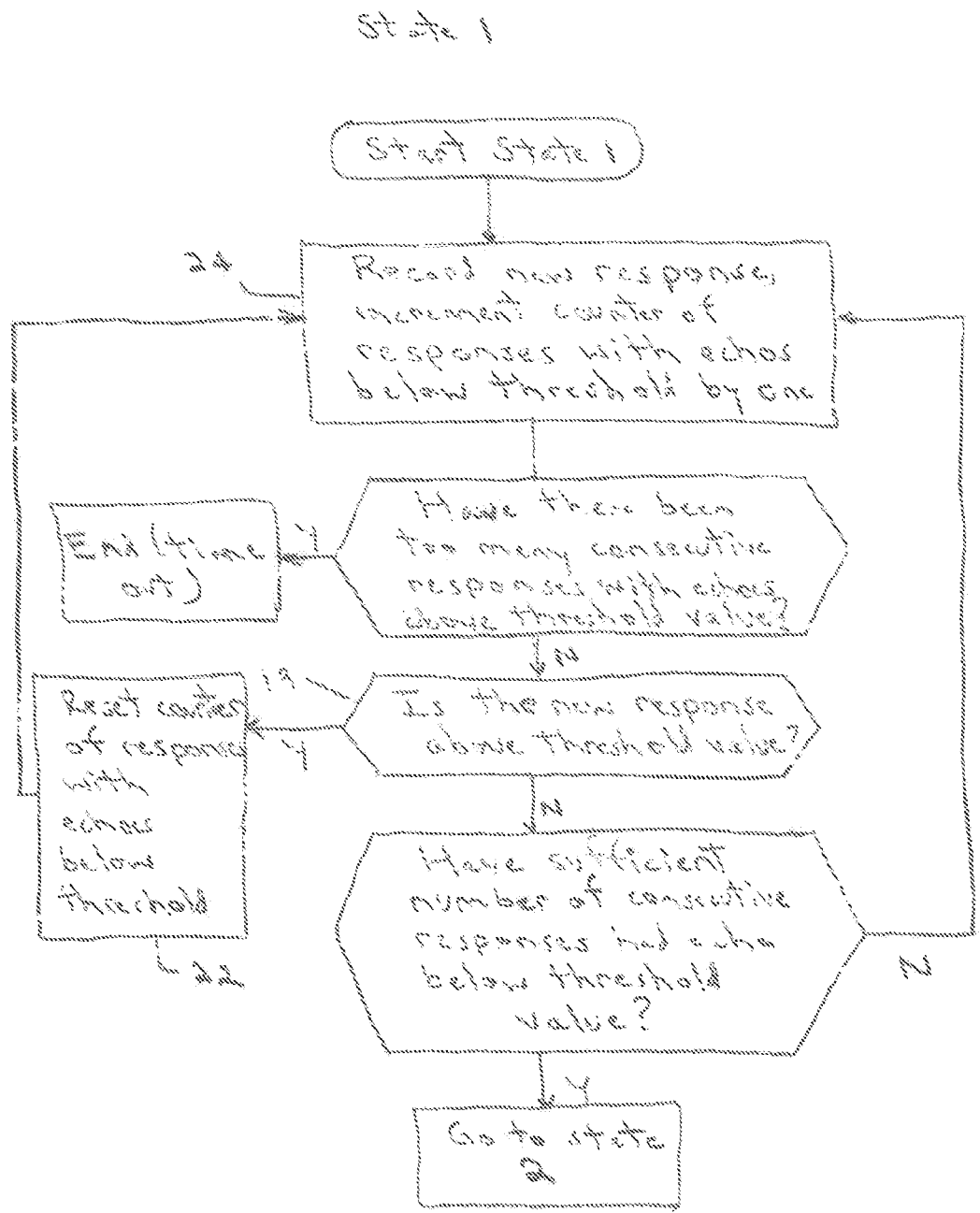
FIG. 4A is a flowchart depicting a process to determine that a sensor antenna of the tachometer of FIG. 2 is outside an interrogatable range.
Figure 4B:
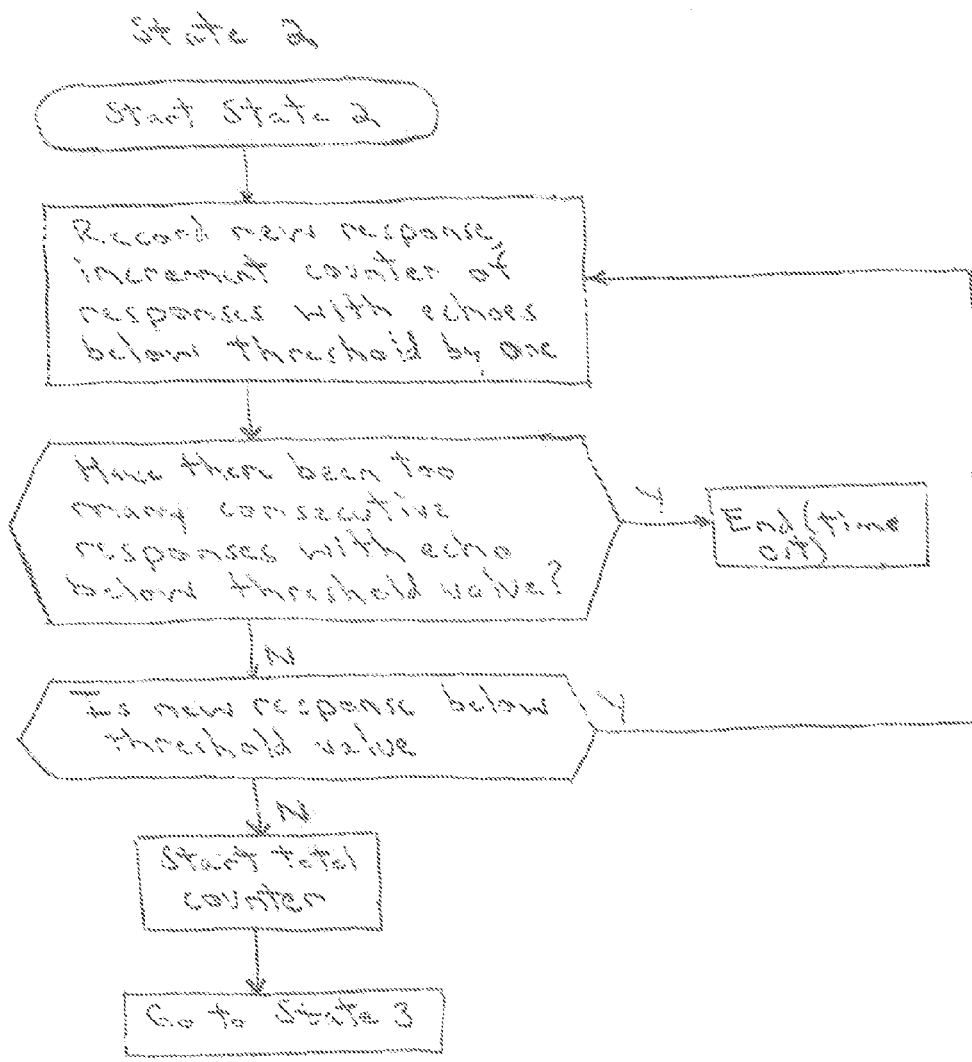
FIG. 4B is a flowchart depicting a process to determine that a sensor antenna of the tachometer of FIG. 2 has entered an interrogatable range.
Figure 4D:
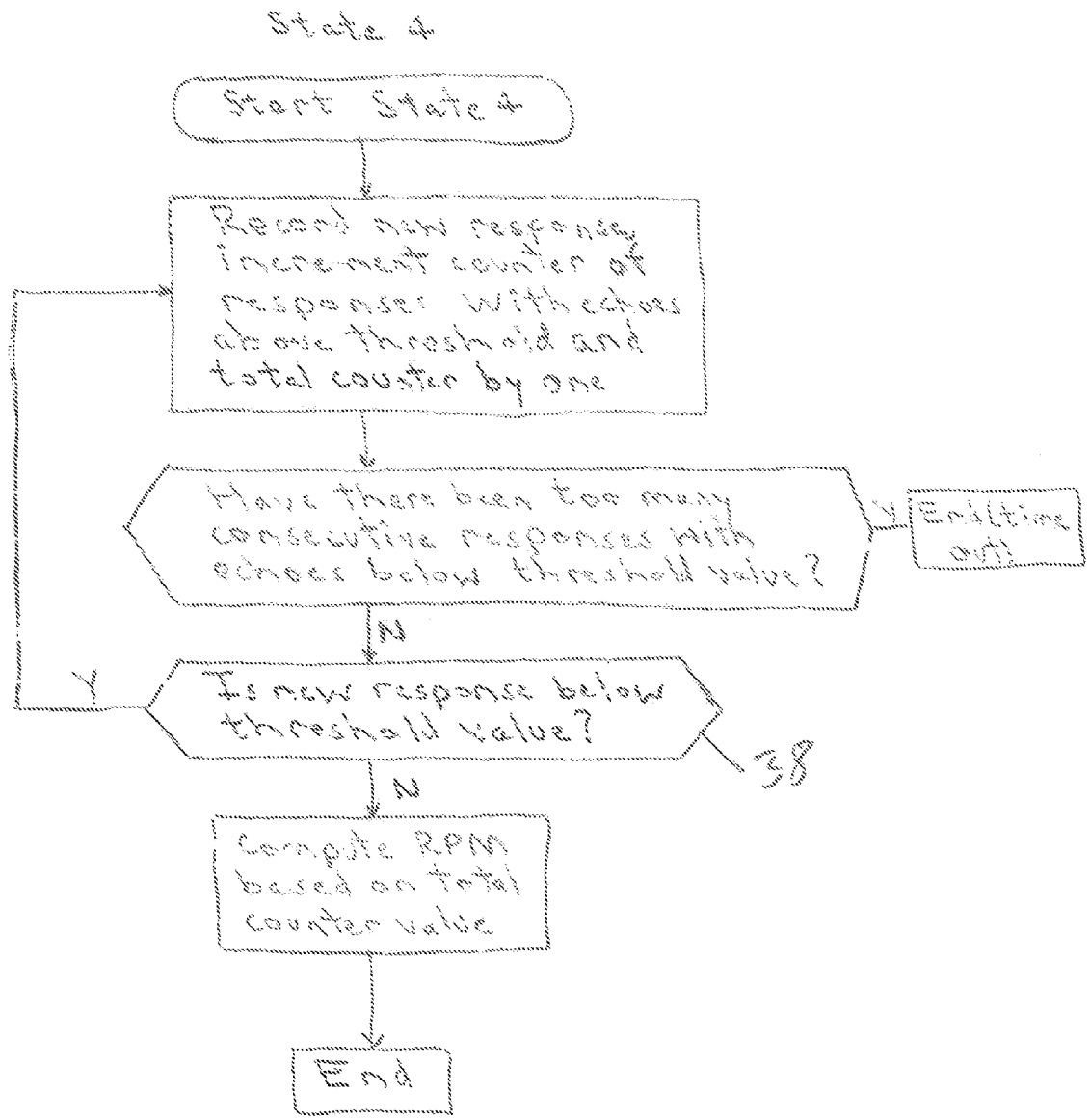
FIG. 4D is a flowchart depicting a process to determine that a sensor antenna of the tachometer of FIG. 2 has re-entered the interrogatable range and completed one revolution.

Additional methods can be implemented for any number of sensor antennas. FIG. 3 shows a two-sensor embodiment of a SAW-based tachometer 10', with a pair of sensor antennas 2, 8' on the rotating disc 1.

The flow chart of FIGS. 4A-4D depicts an algorithm that executes through four states defined as follows:

State 1 ensures that the senor antenna 2 is outside the interrogatable range, e.g., sensor is not in region 7.

State 2 waits for the sensor antenna 2 to enter region 7 and start the RPM tick counter of the number of detected echo signals.

State 3 counts the echo signals and waits for the sensor antenna 2 to exit region 7.

State 4 waits for the sensor antenna 2 to complete one revolution back (through a second portion of region 6 and through region 5) to the beginning of region 7 and stops counting the echo signals to calculate the RPM value.

With reference to FIG. 2, when RPM detection begins the position of the sensor antenna 2 is not known. Therefore, state 1 ensures that the sensor antenna 2 is in the region 5 where the echo signal is less than the threshold value before attempting to determine the RPM value. To avoid any glitches the algorithm that executes to determine the RPM value waits for a certain number of echo signals with below-threshold values during the execution of state 1 segment of the algorithm, as depicted in the software flowchart of FIG. 4.

If an above-threshold echo signal is detected at a decision step 19 during execution of state 1, the algorithm resets the below-threshold counter at a step 22 and returns to an entry step 24. After a sufficient number (predetermined) of echo signals with below threshold values have been detected, the algorithm moves to state 2.

Note that each of the four depicted states for the algorithm of FIGS. 4A-4D includes an End (time-out) step. If there are a predetermined number of "too many" consecutive echo signals either above or below the threshold value (or in the case of state 3, too many measured responses) then execution ends. Execution of the algorithm can be restarted at state 1 to again attempt to determine the RPMs of the rotating disc 1.

For example, a predetermined number of consecutive echo signals below a threshold may indicate that the sensor antenna 2 is in region 5 and the disc 1 is not rotating. Similarly, a predetermined number of consecutive echo signals above the threshold may also indicate that the disc 1 is not rotating, but in this situation the sensor antenna 2 is stalled in region 7. In either of these two situations the tachometer 10 did not detect an echo signal cross over, i.e., from a low echo signal less than the threshold value to a high echo signal greater than the threshold value as the sensor antenna 2 crosses from region 6 to 7, or from a high echo signal to a low echo signal as the sensor antenna 2 crosses over from region 7 to region 6. In either case execution is aborted to be restarted again.

Returning to the state 1 algorithm, after a predetermined number of consecutive below threshold echo signals, where that number is selected by the user and based on the interrogation frequency, the tachometer 10 determines that the sensor antenna 2 is within region 5.

The algorithm moves to state 2 during which it awaits the first echo signal that crosses the threshold value, indicating that the sensor antenna 2 has now entered region 7. As execution leaves state 2 the echo signal counter is started.

The algorithm moves to state 3 during which it counts echo signals and awaits the sensor antenna 2 to move out of region 7. During state 3, a first number of echo signals are counted that exceed the threshold value, when the sensor antenna 2 is in the region 7 during the revolution of the disc 1.

At a decision block 34 the algorithm determines whether a sufficient number of echo signals have been below the threshold value, as an indication that the sensor antenna 2 has moved out of region 7. An affirmative answer moves processing to state 4.

In state 4 the algorithm continues to count the number of echo signals while waiting for the sensor antenna 2 to complete one revolution. At a decision block 38 when the echo signal has again re-crossed from below the threshold value to above the threshold value after one revolution of the disc 1, (indicating that the sensor antenna 2 is again back at the beginning of region 7) the echo signal counter is stopped and the RPM value calculated. During state 4, a second number of echo signals are counted that are less than the threshold value, when the sensor antenna is outside region 7 (i.e., in regions 5, 6) during the revolution of the disc 1.

The final echo signal count is inversely proportional to the RPM with coefficient $$\frac{60}{12\ \text{microseconds}}.$$

With minor modifications, the algorithm set forth in FIGS. 4A-4D can be adapted to a multi-sensor system, such as the tachometer 10' of FIG. 2, for example.

In certain embodiments where it is desired to determine a condition of the rotating disc 1 it is desirable to record (and/or transmit) and later evaluate the echo signals. Certain characteristics of the echo signal may be indicative of the condition of the rotating disc 1. But when it is desired only to determine the RPM of the disc 1, an analysis of the individual echo signals is not required. In that case it is only necessary to determine the magnitude of each echo signal relative to the threshold value.

While certain embodiments of the present invention have been shown and described herein, such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for determining a number of revolutions per minute (RPM) of a rotating object, comprising:
    transmitting interrogation signals at a regular period from a fixed antenna positioned adjacent to the rotating object;
    transmitting echo signals from a sensor antenna positioned on the rotating object, in response to the interrogation signals;
    counting a number of echo signals detected by the fixed antenna during one revolution of the object; and
    determining the RPM of the rotating object based on the number of echo signals and the regular period of the signals.

2. The method of claim 1, wherein the counting of the number of echo signals comprises:
    counting a first number of echo signals detected by the fixed antenna that exceed a threshold value when the sensor antenna is in a first region during the revolution of the object; and
    counting a second number of echo signals detected by the fixed antenna that are less than the threshold value when the sensor antenna is in a second region outside the first region during the revolution of the object.

3. The method of claim 2, wherein the first region is more proximate to the fixed antenna than the second region.

4. The method of claim 1, wherein the counting of the number of echo signals comprises:
    starting the counting of the number of echo signals when the echo signal detected by the fixed antenna crosses a threshold value; and
    stopping the counting of the number of echo signals when the echo signal detected by the fixed antenna re-crosses the threshold value after the one revolution of the object.

5. The method of claim 4, wherein the starting step is performed when the echo signal increases from below the threshold value to above the threshold value; and
    wherein the stopping step is performed when the echo signal increases from below the threshold value to above the threshold value after the one revolution of the object.

6. The method of claim 5, wherein the echo signal increases from below the threshold value to above the threshold value upon the sensor antenna passing from a second region to a first region during the revolution of the object, wherein the first region is more proximate to the fixed antenna than the second region.

7. A method for determining a number of revolutions per minute (RPM) of a rotating object, comprising:
    transmitting interrogation signals at a regular period from a fixed antenna positioned adjacent to the rotating object;
    transmitting echo signals from a sensor antenna positioned on the rotating object, in response to the interrogation signals;
    starting a count of the echo signals upon determining that the echo signal detected by the fixed antenna has crossed a threshold value;
    stopping the count of the echo signals upon determining that the echo signal has re-crossed the threshold value after one revolution of the object; and
    determining the RPM of the rotating object based on the count of the echo signals and the regular period of the signals.

8. The method of claim 7, further comprising determining that the sensor antenna is positioned in a second region prior to the starting of the count of the echo signals, wherein the echo signals transmitted from the second region are detected by the fixed antenna below the threshold value.

9. The method of claim 8, wherein the determining that the echo signal has crossed the threshold value comprises determining that the sensor antenna has passed from the second region into a first region wherein the echo signals transmitted from the first region are detected by the fixed antenna above the threshold value.

10. The method of claim 8, wherein the determining that the sensor antenna is positioned in the second region comprises detecting at least a threshold number of echo signals below the threshold value by the fixed antenna.

11. The method of claim 7, wherein the determining that the echo signal has crossed the threshold value comprises detecting a variation in the echo signal from below the threshold value to above the threshold value.

12. The method of claim 8, further comprising determining whether the sensor antenna stopped rotating in the second region based on detecting at least a predetermined number of echo signals below the threshold value by the fixed antenna.

13. The method of claim 9, further comprising determining whether the sensor antenna stopped rotating in the first region based on detecting at least a predetermined number of echo signals above the threshold value by the fixed antenna.

14. A system for determining a number of revolutions per minute (RPM) of a rotating object, comprising:
    a fixed antenna positioned adjacent to the rotating object, said fixed antenna configured to transmit interrogation signals at a regular period;
    a sensor antenna positioned on the rotating object, said sensor antenna configured to transmit echo signals in response to the interrogation signals; and
    a controller coupled to the fixed antenna, said controller configured to count a number of echo signals detected by the fixed antenna during one revolution of the object and said controller configured to determine the RPM of the rotating object based on the number of echo signals and the regular period of the signals.

15. The system of claim 14, wherein the controller is configured to count a first number of echo signals detected by the fixed antenna that exceed a threshold value when the sensor antenna is in a first region during the revolution of the object and wherein the controller is configured to count a second number of echo signals detected by the fixed antenna that are less than the threshold value when the sensor antenna is in a second region outside the first region during the revolution of the object.

16. The system of claim 15, wherein the first region is more proximate to the fixed antenna than the second region.

17. The system of claim 14, wherein the controller is configured to start the count of the number of echo signals when the echo signal detected by the fixed antenna crosses a threshold value and wherein the controller is configured to stop the count of the number of echo signals when the echo signal detected by the fixed antenna re-crosses the threshold value after the one revolution of the object.

* * * * *